Patented Feb. 4, 1947

2,415,347

UNITED STATES PATENT OFFICE 2,415,347

TREATMENT AND UTILIZATION OF CASHEW NUTSHELL LIQUID

Ernest H. Freund and Paul Mahler, New York, N. Y., assignors, by direct and mesne assignments, to General Foods Corporation, New York, N. Y., a corporation of Delaware No Drawing. Application May 31, 1941,
Serial No. 396,162

3 Claims. (Cl. 260—400)

This invention relates to the treatment and to the utilization of cashew nut shell liquid which is an oily liquid obtained from the shells of the cashew nuts.

The usability of this liquid for the manufacture of aldehyde hardened products, insulating materials, lacquers, varnishes, coatings and similar articles has been known for decades.

The cashew nut shell liquid available from commercial sources varies greatly according to the method of liberating the same from the shells and of treating the liberated liquid. Whereas liquid obtained by extraction at a substantially normal temperature contains about 60-90% anacardic acid, the heat treated product contains only about 15% of this acid.

Derivatives of the cashew nut shell oil or its constituents respectively may be easily produced. Carbon dioxide may be easily split off from the anacardic acid by heating and the OH-group of the phenolic nucleus of the substances of which the cashed nut shell liquid essentially consists may be readily etherified.

By distilling the cashew nut shell liquid, particularly in vacuo, or with steam, or by treating the liquid with small quantities of sulphuric acid, an oily liquid results which is somewhat less reactive to resinification.

It is an object of this invention to manufacture from the cashew nut shell liquid water soluble substances by sulfonation.

It is a further object of the invention to practically prevent during this manufacturing step resinification of the sulfonated products to a degree which causes insolubility.

It is also an object of the invention to produce by sulfonation of the cashew nut shell liquid highly efficient wetting and tanning agents and detergents.

The resinification of unsaturated substances derived from the cashew nut shell liquid with concentrated sulfuric acid by a violent exothermic reaction is known. Also known is the resinification with concentrated sulfuric acid of substances similar to the cashew nut shell liquid containing a phenol nucleus and an unsaturated side chain which does not contain an alphaethylene group and is, therefore, not easily polymerizable by itself. It might be rightly assumed that a reaction takes place in such a manner that the phenol nucleus of one molecule is added to the double bond on another molecule, which latter with its phenol nucleus again reacts with the unsaturated bond of a third molecule and that in this manner a chain is formed. The addition of a phenol nucleus to unsaturated bonds has been investigated by many authors for instance by J. B. Niederl, compare U. S. Patent #2,082,459.

Now, I do not state it as a certainty that this theory is correct or that it may be justly applied to the resinification of cashew nut shell liquid when treated with concentrated sulfuric acid; however, this theory explains very reasonably the manufacture of the water-soluble sulfonated substances not resinified to insolubility from cashew nut shell liquid in accordance with the present invention. It may be understood that in carrying out this invention a polymerization within certain limits may well be permitted; however, care must be taken that the formation of products leading to insoluble resins is avoided. In this connection the maintenance of certain sulfonation temperatures is of importance as the degree of resinification is dependent thereupon.

I shall now proceed to set forth in a general manner the several modifications of my invention.

One way of manufacturing the water soluble sulfonated but not resinified derivatives of the cashew nut shell oil is based on the joint sulfonation of the liquid and unsaturated fatty compounds; thereby, it might be rightly assumed that at least partly a condensation takes place of the cashew nut shell liquid with the unsaturated fatty compounds which may interrupt chain formation and, therefore, resinification.

Almost all varieties and modifications of the cashew nut shell liquid and its derivatives may be utilized for carrying out this invention. Particularly useful as addition products for sulfonation are those high-molecular fatty compounds which contain unsaturated bonds, e. g., oleic acid, ricinoleic acid, castor oil, fish oil, oleylalcohol and the like.

In the performance of the invention, suitable quantities of the cashew nut shell liquid and of the unsaturated fatty compounds are mixed together and sulfonated by the addition of suitable sulfonating agents, e. g., concentrated sulfuric acid or chlorosulfonic acid and the like. It is advisable to perform the sulfonation at low temperatures, for example, not exceeding about 50° C. Diluents may be used, but are not necessary.

Another modification of the invention is based on the fact that the unsaturated bond of the cashew nut shell liquid may be condensed with a phenolic-sulfonic acid such as cresol-sulfonic acid or naphthol-sulfonic acid. These acids may be broadly defined as substances of the phenol type containing a sulfo group in their nucleus.

These condensations are preferably carried out at elevated temperatures. For this reaction those cashew nut shell liquids may be preferably used which are prepared by distillation of the original cashew nut shell oil and possess a somewhat reduced tendency to resinification, for instance, an oil produced by distillation in vacuo of the extracted cashew nut shell oil. Small amounts of catalysts may be used for this sulfonation. The phenolic-sulfonic acids may be employed in a crude state. Particularly those phenolic-sulfonic acids may advantageously be employed which are obtained by sulfonation of a mixture of a meta- and paracresol. A reaction temperature between 95 to 130° C. has been found to be particularly useful. However, higher or lower temperatures may be employed.

Instead of condensing the cashew nut shell liquid with phenolic-sulfonic acids, the invention may also be performed by the simultaneous sulfonation of a mixture of a phenol and the cashew nut shell liquid. Suitable phenols are for instance a commercial mixture of meta- and paracresol. The same sulfonating agents as described for use with the first modification of the invention may be employed.

With the above recited modifications of my invention the cashew nut shell liquid may be subjected to a preliminary treatment with aldehyde and with or without a catalyst. However, it is also possible to treat the final products with an aldehyde and particularly with formaldehyde provided that the added amount and the acidity is adjusted in such a manner that the water-solubility is preserved.

The thus manufactured water-soluble products are excellent detergents and wetting agents. They precipitate gelatin and may also be used as tanning agents. Particularly suitable as tanning agents are those products which before or after the treatment according to this invention are condensed with aldehydes and particularly with formaldehyde.

The following examples are given for purposes of illustrating my invention but it is not intended to limit the invention to the contents of these examples.

*Example 1*

Two parts by weight of a cashew nut shell liquid liberated from the shells at a low temperature and having a iodine number of 295 and an anacardic acid content of about 70% are thoroughly mixed with 1 part of oleic acid. To this mixture are gradually added 1.2 parts by weight of 98% sulfuric acid. The temperature is maintained at approximately 15° C. After sulfonation, the mixture is diluted with 3 parts of water and thoroughly mixed. After settling, the aqueous liquid which contains a very small quantity of the sulfo-compound is separated and the settled product is again treated with 8 parts of water and thoroughly mixed. The thus obtained product is a very efficient wetting agent. If .25 parts by weight of 40% formaldehyde are added and the mixture is allowed to stand for about 48 hours at room temperature, a heavy viscous, sometimes gelatinous mass is obtained which is easily soluble in water and has an excellent precipitative power for gelatin.

*Example 2*

100 parts by weight of a commercial mixture of meta- and paracresol are reacted at 100° C. with 100 parts by weight of concentrated sulfuric acid; to the thus produced cresolsulfonic acid 266 parts by weight of a cashew nut shell liquid are added which is obtained by distillation in vacuo of the extracted cashew nut shell liquid. By heating and stirring for 1½ hours at about 125° C. the mixture becomes water-soluble and represents a very useful deterging and tanning agent. The product may be diluted with a double amount of water and 25 parts by weight of a 40% formaldehyde solution may be added.

After allowing to stand for about 30 hours at room temperature, a gelatinous mass is obtained which is water-soluble; it has an excellent precipitative power for gelatin and is particularly useful as a tanning substance.

*Example 3*

1 part by weight of cashew nut shell liquid liberated from the nut shells by extraction and having a iodine number of 295 and an anacardic acid content of about 70% is thoroughly mixed with 1 part by weight of a commercial mixture of meta- and paracresol. To this mixture, sulfuric acid (98%) is gradually added under continuous stirring until the mixture becomes completely soluble in water; 2 parts by weight of water are added to this sulfonated mixture under stirring and the mass is allowed to settle. Two layers are thereby produced. After the removal of the supernatant water layers, a sulfonated product results which is soluble in water and precipitates a gelatinous solution. This product may be used as a tanning agent and as a detergent.

*Example 4*

10 parts by weight of a cashew nut shell oil produced by distillation in vacuo from a cashew nut shell liquid liberated from the shells by extraction is condensed with about 2.5–3.0 parts by weight of a 40% aqueous formaldehyde solution in the presence of small amounts of ammonia.

The water is distilled off in vacuo and the residual resin is thoroughly mixed with ten parts by weight of oleic acid. 6 parts by weight of sulfuric acid (98%) are gradually added to the mixture under continuous stirring. The temperature must not be raised above 30° C.; after addition of the total quantity of the sulfuric acid, 30 parts by weight of water are stirred into the mixture and the same is allowed to settle. The supernatant water is removed and the residual highly viscous mass is dissolved in water. The solution precipitates gelatin and is a very useful tanning agent.

*Example 5*

2 parts by weight of cashew nut shell liquid liberated from the nut shells by extraction and having a iodine number of 295 and an anacardic acid content of about 70% are thoroughly mixed with one part by weight of castor oil. Sulfuric acid (98%) is gradually added to the mixture under continuous stirring until the same becomes soluble in water. The temperature is maintained below 30° C. 4 parts by weight of water are added to the sulfonated mixture under stirring and the same is allowed to settle, whereby two superposed layers are produced. After removal of the supernatant water layer, a sulfonated product is obtained which is soluble in water. The watery solution has a strong precipitative power for gelatin; it may be used as a tanning agent and after eventual neutralization as a wetting agent. One part by weight of the sulfonated product may be dissolved in 6 parts by weight of water and .25 parts by weight of formaldehyde are added; the mixture is allowed to stand for about 48 hours at room temperature; a heavy viscous and sometimes gelatinous mass results which is soluble in water and is very useful as a tanning agent.

*Example 6*

From the phenolic compound which is obtained by vacuo distillation of cashew nut shell liquid extracted from the shells of the cashew nuts an amylether is formed caused by interaction with amylchloride and alkali. One part by weight of this amylether and one part by weight of oleic acid are thoroughly mixed; thereupon .6 part by weight of sulfuric acid (98%) are gradually added. The temperature must not be raised above 30° C. 4 parts by weight of water are added and the mixture is allowed to settle. After removal of the supernatant water layer, a water soluble product is obtained which precipitates gelatin solutions and may be used as a tanning agent or after eventual neutralization as a wetting agent. The solution may be treated with formaldehyde in a similar manner as described in the previous examples.

*Example 7*

The sulfonation is performed in the same manner and upon the same materials as described in Example 1. However, the temperature during the sulfonation is raised to about 40° C. and thereby a more viscous mass results which is only soluble in larger quantities of water. The solution also is an efficient tanning agent.

The watery solution has a strong precipitative power for gelatin; it may be used as a tanning agent, and after eventual neutralization as a detergent and as a wetting agent. The solution may be subjected to an additional treatment in the following manner. It is diluted with a double amount of water; .2 part by weight of formaldehyde are added and the mixture is allowed to stand for 48 hours at room temperature; a heavy viscous mass and sometimes a gelatinous mass is produced which is soluble in water and is a very useful tanning agent.

We claim:

1. A method of producing a water-soluble, sulphonated compound from the condensation product of a distillate of cashew nut shell liquid and formaldehyde which comprises mixing said condensation product with a high molecular weight unsaturated fatty acid, and gradually adding concentrated sulphuric acid to the mixture while maintaining the temperature of the reactants at not more than about 30° C.

2. A method of producing a water-soluble sulphonated compound from a substance selected from the group consisting of cashew nut shell liquid, the distillation product of cashew nut shell liquid, and the condensation product of cashew nut shell liquid and formaldehyde, which comprises sulphonating said substance at a temperature below about 50° C. and in the presence of a high molecular weight unsaturated fatty compound selected from the group consisting of esters, acids and alcohols whereby a water-soluble sulphonate is obtained.

3. A method according to claim 2 wherein said substance is cashew nut shell liquid.

ERNEST H. FREUND.
PAUL MAHLER.

REFERENCES CITED

The following references are of record in the file of this patent:

UNITED STATES PATENTS

| Number | Name | Date |
|---|---|---|
| 2,251,536 | Watanake et al. | Aug. 5, 1941 |
| 2,243,088 | Novotny | Aug. 19, 1941 |
| 1,237,405 | Stiasny | Aug. 21, 1917 |
| 2,317,607 | Harvey | Apr. 27, 1943 |
| 2,324,300 | Harvey | July 13, 1943 |

OTHER REFERENCES

Harvey, Ind. & Eng. Chem., vol. 32, pages 1306–1310.
260–512–